Patented Dec. 23, 1947

2,433,047

UNITED STATES PATENT OFFICE 2,433,047

PHOTOPOLYMERIZATION

Ralph F. Hayes, Springfield, Mass., assignor to Monsanto Chemical Company, St. Louis, Mo., a corporation of Delaware No Drawing. Application January 26, 1945, Serial No. 574,812

6 Claims. (Cl. 204—158)

This invention relates to the polymerization of unsaturated organic compounds.

One object of this invention is to provide a process for the polymerization of unsaturated organic compounds.

A further object is to provide a catalyst for the polymerization of unsaturated organic compounds in the presence of ultraviolet light.

Another object is to provide a catalyst for the polymerization of vinyl and substituted vinyl compounds in the presence of ultraviolet light.

A still further object of the invention is to provide a catalyst for the copolymerization of organic compounds having a terminal methylene group with unsaturated organic compounds, in the presence of ultraviolet light.

These and other objects are attained by polymerizing vinyl and substituted vinyl compounds in the presence of ultraviolet light and 2,7-dichloro diphenylene sulfone.

The following examples are illustrative of the invention, but are not intended to limit the scope thereof. Where parts are mentioned, they are parts by weight.

Example I

One part of 2,7-dichloro diphenylene sulfone was mixed with 100 parts of styrene. The mixture was subjected to the action of ultraviolet light from a sunlamp at 74° C. After 15 hours, the styrene had polymerized to a slightly yellow solid which on analysis proved to be 97% polymerized.

As a control, a like amount of styrene containing no catalyst was subjected to the same temperature and light conditions. After 15 hours, the pure styrene was still a liquid and its viscosity did not appear to have increased. On analysis, it was found that the styrene was only 2–3% polymerized.

Example II

One part of 2,7-dichloro diphenylene sulfone was mixed with 100 parts of vinyl chloride. The mixture was subjected to the action of ultraviolet light from a sunlamp at 74° C. In 4 hours the vinyl chloride had polymerized to a solid mass.

A control test was run under the same conditions using vinyl chloride containing no catalyst. The monomer was polymerized to a solid mass in 5.5 hours, taking nearly 40% longer to polymerize.

Example III

One part of 2,7-dichloro diphenylene sulfone was mixed with 100 parts of methyl acrylate. The mixture was subjected to the action of ultraviolet light from a General Electric type S–1 sunlamp at 74° C. The methyl acrylate polymerized to a solid mass in 35 minutes.

A sample of pure methyl acrylate polymerized under the same conditions took 90 minutes to polymerize to a solid mass.

Other unsaturated organic compounds may be substituted in the above examples. Such compounds are organic compounds having a terminal methylene group such as, for example, vinyl derivatives, vinylidene halides, acrylic derivatives, and allyl derivatives.

The vinyl derivatives which may be polymerized with the 2,7-dichloro diphenylene sulfone as catalyst include vinyl esters such as vinyl acetate, vinyl formate, vinyl butyrate, etc., vinyl halides such as vinyl chloride and vinyl bromide, vinyl ethers, vinyl ketones, vinyl aromatic derivatives such as styrene, divinyl benzene, vinyl diphenyl, substituted styrenes including mono and poly chloro styrenes and mono and poly alkyl styrenes.

The acrylic derivatives include acrylic acid and alpha alkyl substituted acrylic acids and their esters and nitriles such as, for example, methyl, ethyl, and propyl acrylates, methyl and ethyl methacrylate, methyl ethacrylate, acrylonitrile, and methacrylonitrile.

Example IV

One part of 2,7-dichloro diphenylene sulfone was mixed with 100 parts of a mixture containing 85 parts of vinyl chloride and 15 parts of diethyl maleate and the mixture was exposed to a sunlamp at 74° C. After 12 hours the vinyl chloride-diethyl maleate mixture was polymerized to a solid mass. Control tests were run on identical vinyl chloride-diethyl maleate mixtures containing (1) no catalyst, and (2) 1.0 part of benzoyl peroxide, using the same temperature and light conditions. After 24 hours, both control mixtures were still liquid and the viscosity of the uncatalyzed mixture was less than that of the mixture containing benzoyl peroxide, indicating a lower degree of polymerization for the uncatalyzed mixture.

Example V

One part of 2,7-dichloro diphenylene sulfone was mixed with 100 parts of a mixture comprising 85 parts of vinyl chloride and 15 parts of methyl acrylate. The mixture was exposed to ultraviolet light from a sunlamp at 74° C. In three hours a solid polymer was obtained. An uncatalyzed mixture of the two monomers did not polymerize to a solid under the above conditions of light and temperature until it had been exposed for five hours.

Other mixtures of vinyl and substituted vinyl compounds with each other or with other unsaturated organic compounds such as unsaturated dibasic acids and their derivatives, e. g. maleic and fumaric acid and their derivatives such as the alkyl esters of maleic acid, fumaronitrile, etc., may be substituted for the mixtures shown in Examples IV and V.

2,7-dichloro diphenylene sulfone is an aromatic sulfone having the following structural formula.

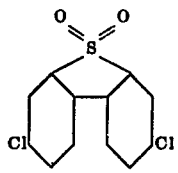

Its preparation is described in Beilstein: Handbuch der Organischen Chemie, fourth edition, first supplement, volume 17, page 30.

The amount of catalyst may also be varied within wide limits such as from about 0.1% to about 5.0% of the weight of the monomer or monomer mixture. The amount of catalyst used will be determined by the molecular weight desired, it being well known that an increased catalyst concentration causes a decrease in the molecular weight of the polymerized product.

The temperature of the polymerization reaction may be varied within wide limits; for example, between about 25° C. and about 150° C., and in some cases temperatures as low as —10° C. may be employed.

Various modifying agents may be added to the monomer prior to polymerization or during the process of the polymerization such as, for example, plasticizers, pigments, dyes, fillers and lubricants.

From the foregoing description, it will be seen that the 2,7-dichloro diphenylene sulfone is far more effective than benzoyl peroxide (the most commonly used catalyst) for the polymerization and copolymerization of unsaturated organic compounds in the presence of ultraviolet light.

The foregoing description is intended to be illustrative and not limitative of the invention as defined in the appended claims.

What is claimed is:

1. A process which comprises polymerizing under the influence of ultraviolet light a polymerizable vinyl aromatic compound admixed with from 0.1 to 5.0% by weight of 2,7-dichloro diphenylene sulfone.

2. A process as in claim 1 wherein the polymerizable vinyl aromatic compound is styrene.

3. A process which comprises polymerizing under the influence of ultraviolet light vinyl chloride admixed with from 0.1 to 5.0% by weight of 2,7-dichloro diphenylene sulfone.

4. A process which comprises polymerizing together under the influence of ultraviolet light vinyl chloride and methyl acrylate admixed with from 0.1 to 5.0% by weight of 2,7-dichloro diphenylene sulfone.

5. A process which comprises polymerizing under the influence of ultraviolet light a polymerizable vinylidene compound admixed with from 0.1 to 5.0% by weight of 2,7-dichloro diphenylene sulfone.

6. A process which comprises polymerizing together under the influence of ultraviolet light at least two polymerizable vinylidene compounds admixed with from 0.1 to 5.0% by weight of 2,7-dichloro diphenylene sulfone.

RALPH F. HAYES.

REFERENCES CITED

The following references are of record in the file of this patent:

UNITED STATES PATENTS

| Number | Name | Date |
|---|---|---|
| 2,068,424 | Mark et al. | Jan. 10, 1937 |
| 2,286,264 | Crawford et al. | June 16, 1942 |
| 2,297,351 | Gerhart | Sept. 29, 1942 |
| 2,380,905 | Stewart | July 31, 1945 |